United States Patent
Sawamura et al.

(10) Patent No.: US 9,188,253 B2
(45) Date of Patent: Nov. 17, 2015

(54) OIL COUNTRY TUBULAR GOODS WITH DUAL PHASE STRUCTURE AND PRODUCING METHOD THEREOF

(75) Inventors: Mitsuru Sawamura, Tokyo (JP); Hitoshi Asahi, Tokyo (JP); Eiji Tsuru, Tokyo (JP); Jun Agata, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 13/806,415

(22) PCT Filed: Jul. 13, 2011

(86) PCT No.: PCT/JP2011/065968
§ 371 (c)(1),
(2), (4) Date: Dec. 21, 2012

(87) PCT Pub. No.: WO2012/008486
PCT Pub. Date: Jan. 19, 2012

(65) Prior Publication Data
US 2013/0118632 A1 May 16, 2013

(30) Foreign Application Priority Data
Jul. 13, 2010 (JP) .................................. 2010-159013

(51) Int. Cl.
*C22C 38/02* (2006.01)
*C22C 38/04* (2006.01)
(Continued)

(52) U.S. Cl.
CPC . *F16L 9/02* (2013.01); *B21B 23/00* (2013.01); *C21D 8/0226* (2013.01);
(Continued)

(58) Field of Classification Search
CPC ........ C22C 38/02; C22C 38/04; C22C 38/48; C21D 8/0226; C21D 2211/005
USPC .................................. 148/328, 622, 590, 521
See application file for complete search history.

(56) References Cited

U.S. PATENT DOCUMENTS

| | | | |
|---|---|---|---|
| 5,755,895 A | * | 5/1998 | Tamehiro et al. ............. 148/336 |
| 2005/0217768 A1 | | 10/2005 | Asahi et al. |

(Continued)

FOREIGN PATENT DOCUMENTS

| | | |
|---|---|---|
| JP | 2000-144329 A | 5/2000 |
| JP | 2005-2385 A1 | 1/2005 |

(Continued)

OTHER PUBLICATIONS

Delince et al. Acta Materialia, 2007, vol. 55, p. 2337-2350.*

(Continued)

*Primary Examiner* — Jie Yang
*Assistant Examiner* — Xiaowei Su
(74) *Attorney, Agent, or Firm* — Birch, Stewart, Kolasch & Birch, LLP

(57) ABSTRACT

A steel pipe with dual phase structure includes, as chemical composition, by mass %, C: 0.07% to 0.15%, Si: 0.1% to 0.5%, Mn: 0.8% to 1.9%, Nb: 0.020% to 0.10%, P: limited to 0.05% or less, S: limited to 0.01% or less, Al: limited to 0.1% or less, and a balance consisting of iron and unavoidable impurities, wherein, when [X] is amount of element X in mass %, carbon equivalent Ceq defined by Equation of Ceq=[C]+[Mn]/6 is 0.25 to 0.40 and [Nb]×[C]≥0.002 is satisfied, and includes, as metallographic structure, by area %, ferrite of 80% to 98% and martensite, residual austenite, or mixture thereof of 2% to 20% in total, wherein average grain size of ferrite is 1 μm to less than 8 μm and average grain size of martensite, residual austenite, or mixture thereof is 0.1 μm to 2 μm.

20 Claims, 1 Drawing Sheet

(51) Int. Cl.
*C22C 38/48* (2006.01)
*C21D 8/04* (2006.01)
*F16L 9/02* (2006.01)
*C21D 8/02* (2006.01)
*C21D 8/10* (2006.01)
*C21D 9/14* (2006.01)
*C22C 38/00* (2006.01)
*C22C 38/06* (2006.01)
*C22C 38/12* (2006.01)
*B21B 23/00* (2006.01)

(52) U.S. Cl.
CPC .............. *C21D 8/0263* (2013.01); *C21D 8/105* (2013.01); *C21D 9/14* (2013.01); *C22C 38/001* (2013.01); *C22C 38/02* (2013.01); *C22C 38/04* (2013.01); *C22C 38/06* (2013.01); *C22C 38/12* (2013.01); *C21D 2211/005* (2013.01); *C21D 2211/008* (2013.01)

(56) References Cited

U.S. PATENT DOCUMENTS

2008/0286504 A1 11/2008 Asahi et al.
2010/0119860 A1 5/2010 Hitoshi et al.

FOREIGN PATENT DOCUMENTS

| WO | WO 2004/001076 A1 | 12/2003 |
| WO | WO 2005/080621 A1 | 9/2005 |
| WO | WO 2009/014238 A1 | 1/2009 |

OTHER PUBLICATIONS

Machine translation of JP2005-002385A, Jan. 2005.*
International Search Report for PCT/JP2011/065968 dated Oct. 18, 2011.

* cited by examiner

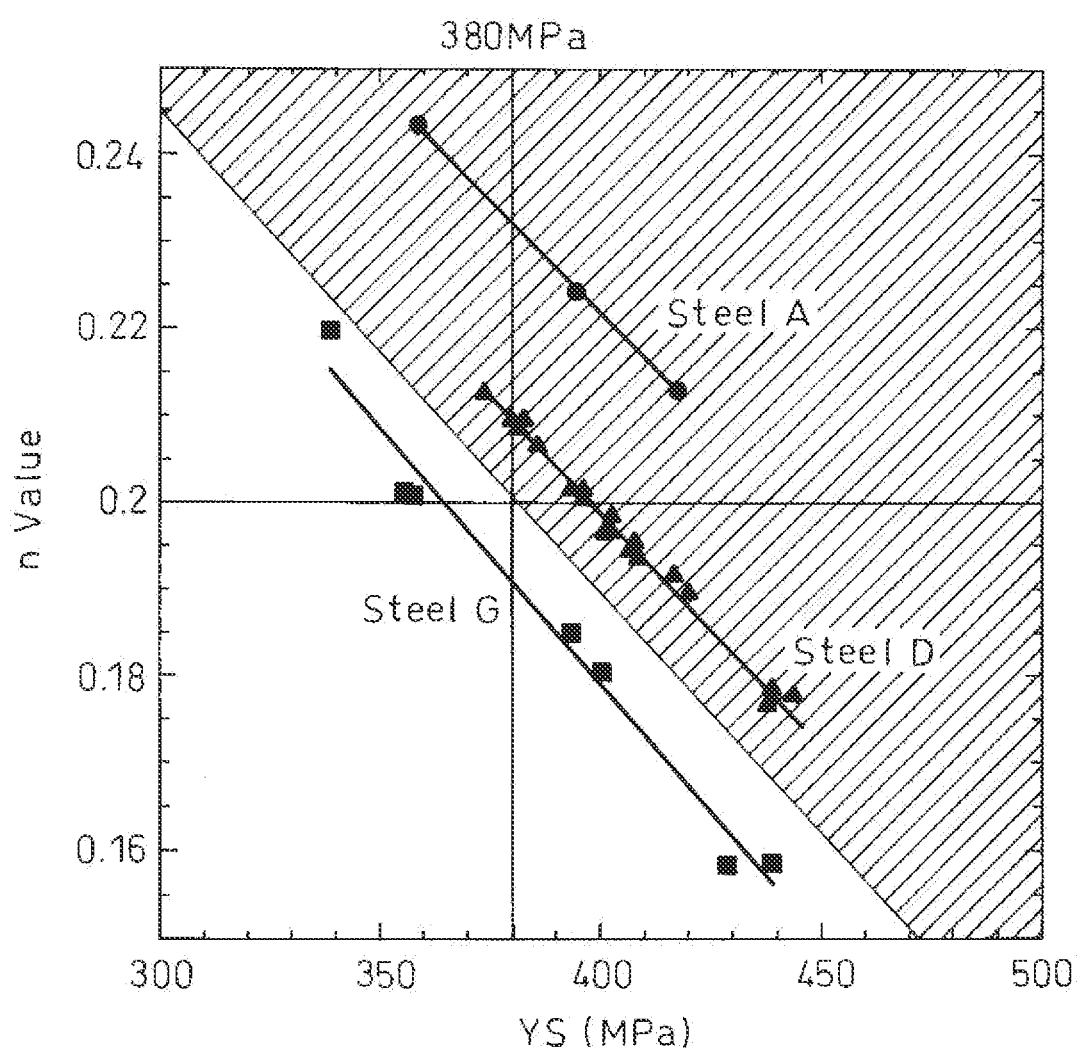

OIL COUNTRY TUBULAR GOODS WITH DUAL PHASE STRUCTURE AND PRODUCING METHOD THEREOF

TECHNICAL FIELD

The present invention relates to oil country tubular goods with a dual phase structure and with an excellent pipe-expandability, for which the metallographic structure is controlled by forming a steel pipe by using a hot rolled steel plate with an optimum alloy composition, by heating the steel pipe to a temperature (two phase region) where two phase of an austenite and a ferrite coexists, and by quenching, and a producing method thereof.

Priority is claimed on Japanese Patent Application No. 2010-159013, filed Jul. 13, 2010, the content of which is incorporated herein by reference.

BACKGROUND ART

In recent years, a technology which is to expand oil country tubular goods by 10% to 30% and is to use in a well is developed, and the technology has greatly contributed to reduction of development costs of an oil well or a gas well. In general, after the steel pipe is expanded to a circumferential direction, collapse pressure decreases because of bauschinger effect. The bauschinger effect is a phenomenon in which, in case that plastic strain is applied by plastic deformation and subsequently stress is applied to a direction opposite to the direction where the plastic strain is applied, yield stress to the direction opposite to the direction where the plastic strain is applied decreases as compared to before the plastic deformation.

For the problem, Patent Documents 1 and 2 suggest the steel pipes which are excellent in collapse properties after pipe-expanding. The steel pipe disclosed in the Patent Document 1 is that microstructure includes a bainite or a bainitic ferrite and the collapse pressure increases by dislocation pinning of solid-soluted C after pipe-expanding. The steel pipe disclosed in the Patent Document 2 is that microstructure consists of a dual phase structure which is the ferrite and a finely dispersed martensite and which suppresses the bauschinger effect.

In addition, when pipe-expanding ratio becomes large, cracks may initiate locally because thickness of the steel pipe may thin locally. For the problem, Patent Document 3 suggests the steel pipe in which microstructure is controlled to a dual phase structure which has a soft phase and a hard phase, because an increase in a work hardening coefficient (n value) is effective.

In the microstructure of the steel pipe disclosed in the Patent Document 3, the soft phase is the ferrite, a tempered martensite, or a tempered bainite, and the hard phase is a martensite-austenite constituent (MA). The MA is obtained by heating the steel pipe to the two phase region and air-cooling.

RELATED ART DOCUMENT

Patent Documents

[Patent Document 1] International Patent Application, Publication No. WO2004/001076
[Patent Document 2] International Patent Application, Publication No. WO2005/080621
[Patent Document 3] International Patent Application, Publication No. WO2009/014238

SUMMARY OF INVENTION

Technical Problem

The oil country tubular goods with the dual phase structure which are produced by heating the steel pipe itself to a temperature of the two phase region of the ferrite and the austenite and by quenching (hereinafter, referred to as two phase region quenching) have a problem such that the n value increases but the yield stress (YS) decreases. The YS is an important factor related to the collapse pressure, and the collapse pressure tends to decrease with a decrease in the YS. An object of the invention is to provide the oil country tubular goods with the dual phase structure which are excellent in both properties of the YS and the n value, which are produced by the two phase region quenching.

Solution to Problem

In order to achieve the object, an aspect of the present invention employs the following component.

(1) A steel pipe with a dual phase structure includes as a chemical composition, by mass %,
C: 0.07% to 0.15%,
Si: 0.1% to 0.5%,
Mn: 0.8% to 1.9%,
Nb: 0.020% to 0.10%,
P: limited to 0.05% or less,
S: limited to 0.01% or less,
Al: limited to 0.1% or less, and
a balance consisting of iron and unavoidable impurities, wherein a carbon equivalent Ceq defined by an (Equation 1) is 0.25 to 0.40 and $[Nb] \times [C] \geq 0.002$ is satisfied when a [X] is an amount of an element X in mass %, and
the steel pipe with the dual phase structure includes as a metallographic structure, by area %, a ferrite of 80% to 98% and a martensite, a residual austenite, or a mixture thereof of 2% to 20% in total, wherein an average grain size of the ferrite is 1 μm to less than 8 μm and an average grain size of the martensite, the residual austenite, or the mixture thereof is 0.1 μm to 2 μm.

$$Ceq=[C]+[Mn]/6 \qquad \text{(Equation 1)}$$

where the [X] expresses the amount of the element X in mass %.

(2) The steel pipe with the dual phase structure according to (1) may further include as the chemical composition, by mass %, at least one of
V: 0.0001% to 0.02%,
Ti: 0.005% to 0.03%,
Ca: 0.001% to 0.010%, and
N: 0.001% to 0.01%,
wherein $[V]/[Nb] \leq 1/3$ may be satisfied when the [X] is the amount of the element X [in mass %] and the carbon equivalent Ceq may be defined as an (Equation 2) on behalf of the (Equation 1).

$$Ceq=[C]+[Mn]/6+[V]/5 \qquad \text{(Equation 2)}$$

where the [X] expresses the amount of the element X in mass %.

(3) In the steel pipe with the dual phase structure according to (1) or (2),
the Nb content of the chemical composition may be 0.040% to 0.10% and $[Nb] \times [C] \geq 0.003$ may be satisfied when the [X] is the amount of the element X in mass %.

(4) In the steel pipe with the dual phase structure according to (1) or (2), a plate thickness of the steel pipe with the dual phase structure may be 5 mm to 15 mm.

(5) A producing method of a steel pipe with a dual phase structure includes, a hot rolling process of making a hot rolled steel plate under a condition in which an average grain size of a ferrite is controlled to be 1 μm to less than 10 μm by using a steel material which includes, as a chemical composition, by mass %, C: 0.07% to 0.15%,
Si: 0.1% to 0.5%,
Mn: 0.8% to 1.9%,
Nb: 0.020% to 0.10%,
P: limited to 0.05% or less,
S: limited to 0.01% or less,
Al: limited to 0.1% or less, and a balance consisting of iron and unavoidable impurities, wherein a carbon equivalent Ceq defined by an (Equation 3) is 0.25 to 0.40 and [Nb]×[C]≥0.002 is satisfied when a [X] is an amount of an element X in mass %, a pipe-making process of making a steel pipe of the hot rolled steel plate, and a heating and quenching process of heating the steel pipe to a temperature of more than $Ac_1$ at which an austenite transformation starts to less than $Ac_3$ at which the austenite transformation finishes and of quenching.

$$Ceq=[C]+[Mn]/6 \quad \text{(Equation 3)}$$

where the [X] expresses the amount of the element X in mass %.

(6) In the producing method of the steel pipe with the dual phase structure according to (5), the steel material may further include as the chemical composition, by mass %, at least one of V: 0.0001% to 0.02%,
Ti: 0.005% to 0.03%,
Ca: 0.001% to 0.010%, and
N: 0.001% to 0.01%,

[V]/[Nb]≤1/3 may be satisfied when the [X] is the amount of the element X [in mass %], and the carbon equivalent Ceq may be defined as an (Equation 4) on behalf of the (Equation 3).

$$Ceq=[C]+[Mn]/6+[V]/5 \quad \text{(Equation 4)}$$

where the [X] expresses the amount of the element X in mass %.

Advantageous Effects of Invention

According to the present invention, the oil country tubular goods which are excellent in the both properties of the YS and the n value and excellent in the pipe-expandability can be provided. Accordingly, the present invention contributes significantly to the industry.

BRIEF DESCRIPTION OF DRAWINGS

FIG. 1 is a graph showing a relationship between YS and n value of steel pipes.

DESCRIPTION OF EMBODIMENTS

First of all, a relationship between the YS and the n value which are basic physical properties of the oil country tubular goods with the dual phase structure according to the embodiment will be described.

Steel pipes A, D, and G were made by using hot rolled steel plates with different alloy compositions and metallographic structures. The oil country tubular goods with the dual phase structure are obtained by the two phase region quenching in which the steel pipes are heated to the temperature of the two phase region where the metallographic structure becomes the ferrite and the austenite. The YS and the n value of the oil country tubular goods with the dual phase structure are controlled by changing a heat treatment condition variously within the temperature of the two phase region when the two phase region quenching is conducted. FIG. 1 shows the relationship between the YS and the n value of the steel pipes A, D, and G. In the FIGURE, it is indicated that the n value of either steel pipe decreases with an increase in the YS. Moreover, it is indicated that absolute value of slope of either steel pipe is to be 5.5 to $5.6 \times 10^{-4}$ MPa$^{-1}$.

The object of the invention is to improve the both properties of the YS and the n value of the steel pipe with the dual phase structure. In FIG. 1, it is indicated that the both properties of the YS and the n value of the steel pipe D are more enhanced than that of the steel pipe G and that of the steel pipe A is more enhanced than that of the steel pipe D. Thus, in the oil country tubular goods with the dual phase structure according to the embodiment, a criterion for achievement of the object is that the linear relationship of the YS and the n value exists in an area which is hatched by oblique lines in FIG. 1. This designates that the n value is 0.2 or more when the YS is 380 MPa. Therefore, the oil country tubular goods with the dual phase structure according to the embodiment are to satisfy (Equation A) as described below.

The (Equation A) is obtained by varying the following equation, [n]≥0.20−5.55×10$^{-4}$ ([YS]−380), which expresses that the n value is 0.2 or more when the YS is 380 MPa.

$$[n] \geq -5.55 \times 10^{-4}[YS]+0.411 \quad \text{(Equation A)}$$

For calculation of the n value which is the work hardening coefficient, a stress-strain curve obtained by tensile tests is utilized. The n value is obtained from slope of the stress-strain curve which is expressed by a double logarithmic chart. In addition, a range for the calculation of the n value is a range from 2% in nominal strain through uniform elongation.

Next, the producing method of the oil country tubular goods with the dual phase structure according to the embodiment will be described.

The oil country tubular goods with the dual phase structure according to the embodiment are produced by the following processes.

(1) A hot rolling process of making a hot rolled steel plate under a condition in which an average grain size of the ferrite is controlled to be 1 μm to less than 10 μm by using a steel material which has an alloy composition as described later.

(2) A pipe-making process of making a steel pipe of the hot rolled steel plate.

(3) A heating and quenching process (the two phase region quenching) of heating the steel pipe to a temperature of more than $Ac_1$ at which an austenite transformation starts to less than $Ac_3$ at which the austenite transformation finishes and of quenching.

As mentioned above, the oil country tubular goods with the dual phase structure according to the embodiment are obtained by using the steel material which has the alloy composition as described later and by producing under the processes.

In the process of making the hot rolled steel plate, the average grain size of the ferrite of the metallographic structure of the hot rolled steel plate needs to be 1 μm or more and less than 10 μm. This is the reason why an average grain size of the ferrite of the oil country tubular goods with the dual phase structure after the two phase region quenching is controlled to be 1 μm to less than 8 μm as described above. It is substantially difficult that the average grain size of the ferrite of the hot rolled steel plate is controlled to be less than 1 μm industrially. When the average grain size of the ferrite of the hot rolled steel plate is 10 μm or more, the average grain size of the ferrite of the oil country tubular goods with the dual phase structure after the two phase region quenching cannot be controlled within the above range. It is preferable that the average grain size of the ferrite of the hot rolled steel plate be 1 μm to less than 8 μm. Moreover, the average grain size of the ferrite is measured by an intercept method in accordance with JIS G 0552.

In the metallographic structure of the hot rolled steel plate, in addition to the ferrite which is the primary phase, a pearlite, a bainite, or precipitates such as carbides and nitrides are included. However, the average grain size of the ferrite is the only important factor in the process, because the steel plate is subjected to the two phase region quenching after pipe-making. In order to control the average grain size of the ferrite to be 1 μm to less than 10 μm, it may be important to control cumulative rolling reduction in finishing rolling of the hot rolling and a final pass temperature of the hot rolling in addition to precipitation of Nb carbides as described below. It is preferable that final plate thickness of the hot rolled steel plate for the oil country tubular goods be 5 mm to 15 mm. When the plate thickness is less than 5 mm, collapsing load of the steel pipe may be insufficient. When the plate thickness is more than 15 mm, work load for pipe-making may be excessive. For the reason, it is difficult for the hot rolled steel plate for the oil country tubular goods to control the microstructure as compared with general thin sheets. Therefore, in the hot rolling, it is preferable that the reduction be as large as possible and that the final pass temperature be 900° C. or less.

If the average grain size of the ferrite of the metallographic structure of the hot rolled steel plate with the plate thickness of 5 mm to 15 mm is 1 μm to less than 10 μm, a hot rolling method is not particularly limited. A typical hot rolling condition is shown hereinafter. A heating temperature of the steel material is preferably 1000° C. to 1300° C., and is more preferably 1150° C. to 1250° C. The final pass temperature is preferably a temperature where recrystallization hardly occurs (non-recrystallization temperature), which is preferably 750° C. to 900° C. The cumulative rolling reduction in the finishing rolling of the hot rolling is preferably 30% or more, and is more preferably 40% or more. Moreover, in case of making an electric resistance welded steel pipe of the steel plate in the pipe-making process, the hot rolled steel plate may be water-cooled and subsequently be coiled after the hot rolling. A temperature of coiling is preferably 500° C. to 700° C. Similarly, in case of making a UOE steel pipe, the hot rolled steel plate may be accelerate-cooled and subsequently be air-cooled after the hot rolling.

In the process of making the steel pipe of the steel plate, the electric resistance welded steel pipe, the UOE steel pipe, and the like are made. In the steel pipes, the electric resistance welded steel pipe is preferable. The reason why the electric resistance welded steel pipe is preferable is that productivity is excellent, thickness is relatively uniform, and pipe-expandability and collapse pressure is excellent.

The electric resistance welded steel pipe is made by roll-forming cylindrical shape of the hot rolled steel plate and by electric resistance welding at seam part. The UOE steel pipe is made by making a pipe of the hot rolled steel plate on C-press, U-press, and O-press in UOE process and by submerged-arc-welding at seam part.

In the two phase region quenching process, the steel pipe is heated to the temperature range which is the two phase region of more than $Ac_1$ and less than $Ac_3$, and is quenched. The values of $Ac_1$ and $Ac_3$ are measured by using samples which are taken from the steel pipe before the two phase region quenching or by using samples which are made in a laboratory as steel materials which have the same composition. For example, the transformation temperature at heating the steel is measured by a so-called formastor test in which dilatation is observed by heating the sample at a constant rate. $Ac_1$ which is the starting temperature of the austenite transformation and $Ac_3$ which is the finish temperature of the austenite transformation can be obtained by measuring temperatures of a starting point and an end point of bending from a relationship between the temperature and the dilatation which are measured by the formastor test. A method of the quenching may be selected from suitable methods such as a water quenching, an oil quenching, a liquid nitrogen quenching, and the like in accordance with the steel pipe.

Above, the producing method of the oil country tubular goods with the dual phase structure according to the embodiment was described. Next, the oil country tubular goods with the dual phase structure according to the embodiment will be described.

In order that the oil country tubular goods with the dual phase structure according to the embodiment satisfy the (Equation A), it is necessary to possess the metallographic structure and the alloy composition as described below.

(1) The metallographic structure is that the ferrite of 80% to 98% and the martensite, the residual austenite, or the mixture thereof of 2% to 20% in total are included in area %, the average grain size of the ferrite is 1 μm to less than 8 μm, and the average grain size of the martensite, the residual austenite, or the mixture thereof is 0.1 μm to 2 μm.

(2) The alloy composition includes, in mass %, C: 0.07% to 0.15%, Si: 0.1% to 0.5%, Mn: 0.8% to 1.9%, Nb: 0.020% to 0.10%, P: limited to 0.05% or less, S: limited to 0.01% or less, Al: limited to 0.1% or less, and a balance consisting of iron and unavoidable impurities, the carbon equivalent Ceq defined by the (Equation 1) is 0.25 to 0.40, and [Nb]×[C] ≥0.002 is satisfied, when the [X] is the amount of the element X in mass % and Ceq is defined by the (Equation 1).

$$Ceq=[C]+[Mn]/6 \quad \text{(Equation 1)}$$

Next, the metallographic structure of the oil country tubular goods with the dual phase structure according to the embodiment will be described.

The metallographic structure of the oil country tubular goods with the dual phase structure according to the embodiment is controlled to the dual phase structure which is the ferrite and the secondary hard phase. Herein, the so-called bainitic ferrite which has the carbides and the secondary hard phase intragranularly is not regarded as the ferrite. Moreover, the secondary hard phase indicates the martensite, the residual austenite, or the mixture thereof, and indicates what is observed by a LePera etching in general. The metallographic structure is observed by taking samples at the position which is ¼ in depth of the thickness from an outer surface of the steel pipe, by polishing and etching, and by using an optical microscope. It is difficult to distinguish between the martensite and the residual austenite by the microstructure observation with the optical microscope, but it is possible to analyze a generated amount of the residual austenite by an X-ray diffraction method. In the metallographic structure, a small amount of the pearlite, the bainite, or the precipitates such as the carbides and the nitrides is included. However, since the amount thereof is small as compared with the ferrite and the secondary hard phase, it does not take into consideration for the metallographic structure composition.

Area Fraction of Ferrite: 80% to 98%

The ferrite is the primary phase in the metallographic structure. The area fraction of the ferrite is to be 80% or more and 98% or less. When less than 80%, the fractions of the secondary hard phase, the pearlite, or the bainite increase relatively, so that the (Equation A) is not satisfied. When more than 98%, the (Equation A) is also not satisfied.

Average Grain Size of Ferrite: 1 μm to Less Than 8 μm

The average grain size of the ferrite is to be 1 μm or more and less than 8 μm. It is substantially difficult that the average grain size of the ferrite is controlled to be less than 1 μm industrially. When 8 μm or more, the YS and the n value are not improved because of too coarse, and toughness also decreases. In order to achieve the effect optimally, it is preferable that the average grain size of the ferrite be 1 μm to less than 5 μm. Moreover, the average grain size of the ferrite is measured by the intercept method in accordance with JIS G 0552.

Area Fraction of Martensite, Residual Austenite, or Mixture Thereof: 2% to 20% in Total The martensite, the residual austenite, or the mixture thereof is the secondary hard phase, and improve the YS and the n value by dispersing finely in the metallographic structure and by restraining deformation of the ferrite at the plastic deformation. The area fraction of the martensite, the residual austenite, or the mixture thereof is to be 2% or more and 20% or less in total. When less than 2% in total, the YS and the n value are not improved. When more than 20%, a balance between strength and ductility becomes unsuitable as the oil country tubular goods because of too hardening. Moreover, the area fraction of the martensite, the residual austenite, or the mixture thereof is measured by an image processing. The secondary hard phase can be distinguished from the ferrite by the LePera etching. An average area of the secondary hard phase is measured by the image processing, and is converted to the area fraction.

Average Grain Size of Martensite, Residual Austenite, or Mixture Thereof: 0.1 μm to 2 μm The average grain size of the martensite, the residual austenite, or the mixture thereof is to be 0.1 μm or more and 2 μm or less. It is substantially difficult that the average grain size is controlled to be less than 0.1 μm industrially. When more than 2 μm, the YS and the n value are not improved because of too coarse, and it becomes an origin of fracture. In order to achieve the effect optimally, it is preferable that the average grain size of the martensite and the residual austenite be 0.1 μm to 1 μm. Moreover, the average grain size of the martensite, the residual austenite, or the mixture thereof is measured by an image processing. The secondary hard phase can be distinguished from the ferrite by the LePera etching. An average area and a number of the secondary hard phase are measured by the image processing, and the average grain size is calculated as an equivalent circle diameter.

Next, the alloy composition of the oil country tubular goods with the dual phase structure according to the embodiment will be described.

In the embodiment, the steel material to which Nb and C is added and in which the Nb carbides are finely precipitated are utilized. When the steel material is hot-rolled, the Nb carbides bring about pinning effect and suppress grain growth of the austenite during the hot rolling. In addition, when cooling after the hot rolling, the Nb carbides bring about the pinning effect and suppress grain growth of the ferrite which is transformed from austenite grain boundaries. Thereby, the metallographic structure of the hot rolled steel plate becomes fine. When the steel pipe which is made of the steel plate is heated to the two phase region, the austenite is transformed from ferrite grain boundaries. Namely, ferrite grains of the steel pipe before the two phase region quenching are controlled to be fine by adding Nb, so that it is possible to finely disperse the austenite which is formed during heating to the two phase region in the metallographic structure. As the result, the YS and the n value of the oil country tubular goods with the dual phase structure are improved, because the martensite, the residual austenite, or the mixture thereof which are the secondary hard phase are finely dispersed in the metallographic structure after the two phase region quenching. Moreover, the Nb carbides finely disperse in the ferrite grains, suppress dislocation movements at the plastic deformation, and therefore are effective in improving the YS and the n value of the oil country tubular goods with the dual phase structure.

Hereinafter, base elements of the oil country tubular goods with the dual phase structure according to the embodiment will be described. In addition, unit of content is mass %.

C: 0.07% to 0.15%

C is an element which improves the strength of the steel and also contributes to improvement in the n value of the oil country tubular goods with the dual phase structure. C content is to be 0.07% or more and 0.15% or less. When less than 0.07%, it is difficult that the n value is controlled to be 0.2 or more in case that the YS is 380 MPa. When more than 0.15%, formation of carbide is accelerated, so that the YS increases and the n value decreases.

Si: 0.1% to 0.5%

Si is a deoxidizing element. Si content is to be 0.1% or more and 0.5% or less. When less than 0.1%, deoxidation effect is not acquired. When more than 0.5%, ununiform scales are formed, and a shape of a surface is negatively affected. In order to achieve the effect optimally from a point of view of the toughness of seam portion of the electric resistance welded steel pipe, it is preferable that Si content be 0.2% to 0.4%.

Mn: 0.8% to 1.9%

Mn is an element which contributes to hardenability and improves the strength. Mn content is to be 0.8% or more and 1.9% or less. When less than 0.8%, the strength is insufficient. When more than 1.9%, segregation is promoted, so that the martensite is formed to be lamellar and the n value decreases. In order to achieve the effect optimally, it is preferable that Mn content be 1.0% to 1.5%.

Nb: 0.020% to 0.10%

Nb is an element which refines the grain size by broadening the non-recrystallization temperature range, forms the carbides and the nitrides, and thus contributes to the improvement of the strength. Moreover, Nb is the element which contributes to the improvement of the n value. Nb content is to be 0.020% or more and 0.10% or less. When less than 0.020%, it is difficult that the n value is controlled to be 0.2 or more in case that the YS is 380 MPa. When more than 0.10%, the YS increases and the n value decreases. In order to achieve the effect optimally, it is preferable that Nb content be 0.040% to 0.10%.

[Nb]×[C]≥0.002

By an increase in Nb content and C content, the secondary hard phase finely disperses in the metallographic structure, so that it is possible that the YS and the n value of the oil country tubular goods with the dual phase structure are simultaneously improved. When a [X] is an amount of an element X in mass %, [Nb]×[C] is to be 0.002 or more. When less than 0.002, it is difficult that the n value is controlled to be 0.2 or more in case that the YS is 380 MPa. In order to achieve the effect optimally, it is preferable that [Nb]×[C] be 0.003 or more.

Carbon Equivalent Ceq: 0.25 to 0.40

The Ceq is a parameter of the hardenability. In general, when the [X] is the amount of the element X in mass %, the Ceq is defined by the following Equation.

$$Ceq=[C]+[Mn]/6+([Ni]+[Cu])/15+([Cr]+[Mo]+[V])/5$$

However, in the base elements of the oil country tubular goods with the dual phase structure, Ni, Cu, Cr, Mo, and V are not included, so that the Ceq is defined by the following (Equation 1) which utilizes C content and Mn content.

$$Ceq=[C]+[Mn]/6 \quad \text{(Equation 1)}$$

The Ceq of the above (Equation 1) is to be 0.25 or more and 0.40 or less. When less than 0.25, it is difficult to secure the secondary hard phase and to increase the n value. When more than 0.40%, the strength increases excessively and the n value decreases.

Hereinafter, impurities which need to be particularly reduced among unavoidable impurities will be described. Moreover, a lower limit of the following impurities may be 0%. The unit of content is mass %.

P: Limited to 0.05% or Less

P is an impurity, and the pipe-expandability deteriorates when contained excessively. P content is limited to 0.05% or less. A preferable upper limit of P content is 0.02% or less.

S: Limited to 0.01% or Less

S is an impurity, and hot workability and the pipe-expandability deteriorate when contained excessively. S content is limited to 0.01% or less. A preferable upper limit of S content is 0.005% or less.

Al: Limited to 0.1% or Less

Al is a deoxidizing element. However, when the amount is excessive, inclusions increase, so that the ductility and the pipe-expandability deteriorate. Al content is limited to 0.1% or less. A preferable upper limit of Al content is 0.03% or less. When Si and Ti are utilized as the deoxidizing element, Al does not need to be added. However, in order to reduce oxygen content in molten steel, it is preferable that Al of 0.0005% or more be added.

Hereinafter, selective elements will be described. Addition of the selective elements is not indispensable, and an amount of the selective elements may be 0%. The unit of content is mass %.

V: 0.0001% to 0.02%

V is a selective element which forms the carbides and the nitrides, and may be added in order to improve the strength and to refine the microstructure. However, the n value may decrease by adding V. Thus, it is preferable that V content be 0.0001% or more and 0.02% or less. Less than 0.0001% is below a detection limit of component analysis, and it is difficult to be controlled to the level. When more than 0.02%, the n value may decrease. In order to suppress the decrease in the n value, it is more preferable that V content is 0.0001% to 0.01%.

[V]/[Nb]≤1/3

In case that V needs to be added for the strength improvement, it is preferable to increase Nb content relatively. Thereby, the decrease in the n value can be suppressed. In order to suppress the decrease in the n value, it is preferable that [V]/[Nb] be 1/3 or less. In order to achieve the effect optimally, it is more preferable that [V]/[Nb] is 1/4 or less. Since V is the element which is added selectively, when V is not added intentionally, the [V] is 0. Therefore, a lower limit of [V]/[Nb] is not particularly limited and may be 0.

Carbon Equivalent Ceq: 0.25 to 0.40

In case that V which is the selective element is contained, the carbon equivalent Ceq may be defined as the following on behalf of the (Equation 1).

$$Ceq=[C]+[Mn]/6+[V]/5 \quad \text{(Equation 2)}$$

In case that V which is the selective element is contained, it is preferable that the carbon equivalent Ceq of the (Equation 2) be 0.25 or more and 0.40 or less. When less than 0.25, it may be difficult to secure the secondary hard phase and to increase the n value. When more than 0.40%, the strength may increase excessively and the n value may decrease.

Ti: 0.005% to 0.03%

Ti is a selective element which forms the carbides and the nitrides, improves the strength, and refines the microstructure. It is preferable that Ti content be 0.005% or more and 0.03% or less. When less than 0.005%, the effect of the strength improvement and the microstructure refinement may not be obtained. When more than 0.03%, the coarse carbides and nitrides may be formed, so that the strength improvement and the microstructure refinement may not be obtained and the n value may decrease. In order to achieve the effect optimally, it is more preferable that Ti content is equal to or more than an atomic ratio in accordance with N content.

Ca: 0.001% to 0.010%

Ca is a selective element which prevents oxides from coarsening and improves the pipe-expandability. It is preferable that Ca content be 0.001% or more and 0.010% or less. When less than 0.001%, the effect of preventing the oxide coarsening may not be obtained. When more than 0.010%, the coarse Ca oxides may be formed, so that the pipe-expandability may deteriorate. In order to achieve the effect optimally, it is more preferable that Ca content is 0.001% to 0.004%.

N: 0.001% to 0.01%

N is a selective element which forms the nitrides with Nb, Ti, V, and the like, refines the microstructure of a base metal by suppressing grain coarsening of the austenite at reheating a slab, and contributes to the improvement of the YS and the n value. It is preferable that N content be 0.001% or more and 0.01% or less. When less than 0.001%, the effect of the improvement of the YS and the n value may not be obtained. When more than 0.01%, the nitrides coarsen, so that the effect of precipitation strengthening and the microstructure refinement may not be obtained.

Example

The invention is further explained on the basis of examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

By using the hot rolled steel plates with the plate thickness of 9.5 mm and with the alloy composition as shown in Table 1, the electric resistance welded steel pipes with a diameter of 197 mm were produced. The hot rolled steel plates were made under rolling conditions such that the heating temperature is 1200° C., the final pass temperature of the hot rolling is 800° C., and the temperature of the coiling after the water-cooling at a run-out-table is 550° C. The electric resistance welded steel pipes which were made of the hot rolled steel plates were controlled to the dual phase structure by heating to temperatures as shown in Table 2 and water-cooling.

From the hot rolled steel plates, samples were taken wherein an observed section was a cross section parallel to a rolling direction, the polishing and etching were conducted, and the metallographic structure was observed by using the optical microscope. From the steel pipes with the dual phase structure, samples were taken wherein the observed section was a cross section of a circumferential direction at the position which was ¼ in depth of the thickness from the outer surface, the LePera etching was conducted, and the microstructure was observed by using the optical microscope. By using the taken micrographs, the average grain size of the ferrite was measured by the intercept method in accordance with JIS G 0552, and the average grain size of the martensite, the residual austenite, or the mixture thereof was measured by an image processing.

Samples with a round-bar shape for the tensile test were taken wherein a parallel part was 6 mm φ in diameter and a longitudinal direction was an axial direction of the steel pipe, the tensile tests were conducted in accordance with JIS Z 2241, and the YS was obtained. The n value was obtained from the slope of the stress-strain curve which was expressed by the double logarithmic chart within the range from 2% in the nominal strain through the uniform elongation.

The results are shown in Table 2. In Table 2, the criterial n value which was calculated from the actual measured YS by using the following calculation formula (the right-hand of (Equation A)) is also shown.

$$-5.55 \times 10^{-4}[YS] + 0.411$$

When the actual measured n value is equal to or more than the criterial n value, it can be judged that both the YS and the n value are improved. In the production Nos. 1 to 6 which are the examples of the steel pipes with the dual phase structure, the actual measured n value is equal to or more than the criterial n value, the high n value and the high YS are compatible. On the other hand, in the production Nos. 7 to 13 which are the comparative examples, the actual measured n value is less than the criterial n value.

In No. 7, the value of [Nb]×[C] is small, so that the average grain size of the ferrite and the average grain size of the secondary hard phase of the steel pipe with the dual phase structure become coarse, and the n value decreases.

In No. 8, the value of [V]/[Nb] is large, so that the n value decreases.

In No. 9, Nb content is insufficient, so that the n value decreases.

In No. 10, V content is excessive and the average grain size of the ferrite of the steel pipe with the dual phase structure is coarse, so that the n value decreases.

In No. 11, C content and Mn content are excessive and the Ceq is large, so that the n value decreases.

In No. 12, the area fraction of the secondary hard phase is large, so that the YS increases and the n value is not satisfied.

In No. 13, the heating temperature for the quenching is high and the quenching is conducted from the temperature range where the microstructure becomes the austenite, so that the secondary hard phase is not formed and the n value decreases.

TABLE 1

| Steel No | Chemical Composition (mass %) | | | | | | | | | | | [Nb] × [C] | [V] ÷ [Nb] | Ceq | Note |
|---|---|---|---|---|---|---|---|---|---|---|---|---|---|---|---|
| | C | Si | Mn | P | S | Nb | V | Ti | Al | Ca | N | | | | |
| A | 0.100 | 0.20 | 1.45 | 0.010 | 0.0028 | 0.060 | | 0.015 | 0.016 | 0.0021 | 0.0028 | 0.0060 | 0 | 0.342 | Example |
| B | 0.148 | 0.10 | 0.82 | 0.006 | 0.0030 | 0.050 | | 0.028 | 0.016 | | 0.0028 | 0.0074 | 0 | 0.285 | |
| C | 0.099 | 0.20 | 1.45 | 0.010 | 0.0030 | 0.052 | | 0.015 | 0.094 | | 0.0031 | 0.0051 | 0 | 0.341 | |
| D | 0.114 | 0.31 | 1.30 | 0.016 | 0.0034 | 0.042 | 0.012 | 0.015 | 0.009 | | 0.0011 | 0.0048 | 0.29 | 0.333 | |
| E | 0.078 | 0.26 | 1.35 | 0.016 | 0.0022 | 0.098 | 0.019 | | 0.035 | 0.0027 | 0.0067 | 0.0076 | 0.19 | 0.307 | |
| F | 0.082 | 0.44 | 1.85 | 0.023 | 0.0012 | 0.052 | 0.006 | 0.017 | 0.025 | 0.0051 | 0.0048 | 0.0043 | 0.12 | 0.392 | |
| G | 0.071 | 0.20 | 1.35 | 0.011 | 0.0030 | 0.025 | | 0.016 | 0.016 | | 0.0030 | <u>0.0018</u> | 0 | 0.296 | Comparative |
| H | 0.085 | 0.25 | 1.25 | 0.016 | 0.0034 | 0.084 | <u>0.045</u> | 0.016 | 0.018 | | 0.0026 | 0.0071 | <u>0.54</u> | 0.302 | parative |
| I | 0.141 | 0.22 | 1.15 | 0.011 | 0.0027 | <u>0.019</u> | | 0.015 | 0.018 | | 0.0029 | 0.0027 | <u>0</u> | 0.333 | Example |
| J | 0.073 | 0.26 | 1.45 | 0.010 | 0.0031 | 0.045 | <u>0.022</u> | 0.015 | 0.016 | 0.0250 | 0.0031 | 0.0033 | <u>0.49</u> | 0.319 | |
| K | <u>0.052</u> | 0.20 | <u>2.40</u> | 0.011 | 0.0030 | 0.081 | | 0.016 | 0.016 | | 0.0030 | 0.0042 | 0 | <u>0.452</u> | |
| L | <u>0.169</u> | 0.26 | 1.05 | 0.010 | 0.0031 | 0.040 | 0.011 | 0.015 | 0.016 | | 0.0031 | 0.0068 | 0.28 | 0.346 | |

The underlined value means out of the range of the present invention.

TABLE 2

| | | Hot Rolled Steel Plate | | Steel Pipe with Dual Phase Structure | | | | | | | | | |
|---|---|---|---|---|---|---|---|---|---|---|---|---|---|
| | | | | Heating | | | | | Ferrite | | Secondary Hard Phase | | |
| Production No. | Steel No. | Ac$_1$ °C. | Ac$_3$ °C. | Average Grain Size of Ferrite μm | Temperature for two phase region quenching °C. | Actual Measured YS MPa | Actual Measured n value | Criterial n value | Metallographic Structure *1 | Area Fraction % | Average Grain Size μm | Area Fraction % | Average Grain Size *2 μm | Note |
| 1 | A | 710 | 878 | 8.8 | 850 | 390 | 0.227 | 0.195 | F + M | 95 | 4.2 | 5 | 0.85 | Example |
| 2 | B | 719 | 861 | 5.3 | 860 | 389 | 0.233 | 0.195 | F + M | 89 | 3.5 | 11 | 0.98 | |
| 3 | C | 715 | 877 | 9.1 | 810 | 421 | 0.206 | 0.177 | F + M | 96 | 5.1 | 4 | 1.30 | |
| 4 | D | 719 | 879 | 6.9 | 835 | 394 | 0.203 | 0.192 | F + M | 93 | 4.4 | 7 | 0.62 | |
| 5 | E | 717 | 893 | 9.7 | 790 | 427 | 0.223 | 0.174 | F + M | 97 | 7.2 | 3 | 1.60 | |
| 6 | F | 717 | 893 | 5.8 | 840 | 382 | 0.209 | 0.199 | F + M | 96 | 3.9 | 4 | 1.20 | |
| 7 | G | 714 | 888 | <u>15.9</u> | 845 | 394 | <u>0.185</u> | 0.192 | F + M | 97 | <u>13.5</u> | 3 | <u>2.10</u> | Comparative |
| 8 | H | 716 | 880 | 9.8 | 840 | 375 | <u>0.193</u> | 0.203 | F + M | 96 | 7.5 | 4 | 0.96 | parative |
| 9 | I | 718 | 888 | 6.4 | 825 | 395 | <u>0.184</u> | 0.192 | F + M | 92 | 4.2 | 6 | 1.20 | Example |

TABLE 2-continued

| | | Hot Rolled Steel Plate | | | Heating | | Steel Pipe with Dual Phase Structure | | | | Ferrite | | Secondary Hard Phase | | |
|---|---|---|---|---|---|---|---|---|---|---|---|---|---|---|---|
| Production No. | Steel No. | $Ac_1$ °C. | $Ac_3$ °C. | Average Grain Size of Ferrite μm | Temperature for two phase region quenching °C. | Actual Measured YS MPa | Actual Measured n value | Criterial n value | Metallographic Structure *1 | Area Fraction % | Average Grain Size μm | Area Fraction % | Average Grain Size *2 μm | Note |
| 10 | J | 715 | 888 | <u>13.0</u> | 830 | 407 | <u>0.180</u> | 0.185 | F + M | 93 | <u>9.7</u> | 7 | 1.85 | |
| 11 | K | 705 | 878 | 9.1 | 840 | 395 | <u>0.170</u> | 0.192 | F + M | 98 | 6.9 | 2 | 0.20 | |
| 12 | L | 721 | 846 | 8.7 | 790 | 453 | <u>0.158</u> | 0.160 | F + M | <u>78</u> | 7.8 | <u>22</u> | 1.50 | |
| 13 | A | 710 | 870 | 4.2 | <u>930</u> | 511 | <u>0.087</u> | 0.127 | BF+F | — | — | — | — | |

*1: F indicates a ferrite, M indicates a secondary hard phase. and BF indicates a beinitic ferrite.
*2: An equivalent circle diameter of the secondary hard phase (the martensite, the residual austenite, or the mixture thereof).
The underlined value means out of the range of the present invention.

INDUSTRIAL APPLICABILITY

According to the present invention, the metallographic structure is controlled by forming the steel pipe by using the hot rolled steel plate with the optimum alloy composition, by heating the steel pipe to the temperature (the two phase region) where two phases of the austenite and the ferrite coexist, and by quenching, so that it is possible that both the YS and the n value are simultaneously improved and the oil country tubular goods with the dual phase structure and with the excellent pipe-expandability are obtained. Accordingly, the present invention has significant industrial applicability.

The invention claimed is:

1. A steel pipe with a dual phase structure, the steel pipe comprising, as a chemical composition, by mass %,
   C: 0.07% to 0.15%,
   Si: 0.1% to 0.5%,
   Mn: 0.8% to 1.9%,
   Nb: 0.020% to 0.10%,
   P: limited to 0.05% or less,
   S: limited to 0.01% or less,
   Al: limited to 0.1% or less, and
   a balance consisting of iron and unavoidable impurities,
   wherein a carbon equivalent Ceq defined by an (Equation 1) is 0.25 to 0.40 and $[Nb] \times [C] \geq 0.002$ is satisfied when a [X] is an amount of an element X in mass %, and
   the steel pipe with the dual phase structure comprising, as a metallographic structure, a ferrite and a secondary hard phase,
   wherein, by area % the ferrite is 80% to 98% and the secondary hard phase is 2% to 20%,
   wherein the secondary hard phase consists of a martensite, a residual austenite, or a mixture thereof, and
   wherein an average grain size of the ferrite is 1 μm to less than 8 μm and an average grain size of the secondary hard phase is 0.1 μm to 2 μm, $$Ceq=[C]+[Mn]/6 \quad \text{(Equation 1)}$$

where the [X] expresses the amount of the element X in mass %.

2. The steel pipe with the dual phase structure according to claim 1, further comprising, as the chemical composition, by mass %, at least one of
   V: 0.0001% to 0.02%,
   Ti: 0.005% to 0.03%,
   Ca: 0.001% to 0.010%, and
   N: 0.001% to 0.01%,
   wherein $[V]/[Nb] \leq 1/3$ is satisfied when the [X] is the amount of the element X [in mass %] and the carbon equivalent Ceq is defined as an (Equation 2) on behalf of the (Equation 1), $$Ceq=[C]+[Mn]/6+[V]/5 \quad \text{(Equation 2)}$$

where the [X] expresses the amount of the element X in mass %.

3. The steel pipe with the dual phase structure according to claim 2,
   wherein the Nb content of the chemical composition is 0.040% to 0.10% and $[Nb] \times [C] \geq 0.003$ is satisfied when the [X] is the amount of the element X in mass %.

4. The steel pipe with the dual phase structure according to claim 2,
   wherein a plate thickness of the steel pipe with the dual phase structure is 5 mm to 15 mm.

5. The steel pipe with the dual phase structure according to claim 2,
   wherein the chemical composition, by mass %, consists of
   C: 0.07% to 0.15%;
   Si: 0.1% to 0.5%;
   Mn: 0.8% to 1.9%;
   Nb: 0.020% to 0.10%;
   P: limited to 0.05% or less;
   S: limited to 0.01% or less;
   Al: limited to 0.1% or less;
   at least one selected from the group consisting of
   V: 0.0001% to 0.02%,
   Ti: 0.005% to 0.03%,
   Ca: 0.001% to 0.010%, and
   N: 0.001% to 0.01%; and
   the balance consisting of iron and unavoidable impurities.

6. The steel pipe with the dual phase structure according to claim 2, wherein the chemical composition is free of Ni, Cu, Cr and Mo.

7. The steel pipe with the dual phase structure according to claim 2,
   wherein, by area %, the ferrite is 80% to 98% and the secondary hard phase is 2% to 7%.

8. The steel pipe with the dual phase structure according to claim 2,
   wherein the metallographic structure, by area %, consists of the ferrite and the secondary hard phase.

9. The steel pipe with the dual phase structure according to claim 2, wherein in the metallographic structure, by area %, a total amount of portions except for the ferrite and the secondary hard phase are limited to 2% or less.

10. The steel pipe with the dual phase structure according to claim 1,
wherein the Nb content of the chemical composition is 0.040% to 0.10% and [Nb]×[C]≥0.003 is satisfied when the [X] is the amount of the element X in mass %.

11. The steel pipe with the dual phase structure according to claim 1,
wherein a plate thickness of the steel pipe with the dual phase structure is 5 mm to 15 mm.

12. The steel pipe with the dual phase structure according to claim 1,
wherein the chemical composition, by mass %, consists of
C: 0.07% to 0.15%,
Si: 0.1% to 0.5%,
Mn: 0.8% to 1.9%,
Nb: 0.020% to 0.10%,
P: limited to 0.05% or less,
S: limited to 0.01% or less,
Al: limited to 0.1% or less, and
the balance consisting of iron and unavoidable impurities.

13. The steel pipe with the dual phase structure according to claim 1, wherein the chemical composition is free of Ni, Cu, Cr and Mo.

14. The steel pipe with the dual phase structure according to claim 1,
wherein, by area %, the ferrite is 80% to 98% and the secondary hard phase is 2% to 7%.

15. The steel pipe with the dual phase structure according to claim 1,
wherein the metallographic structure, by area %, consists of the ferrite and the secondary hard phase.

16. The steel pipe with the dual phase structure according to claim 1,
wherein in the metallographic structure, by area %, a total amount of portions except for the ferrite and the secondary hard phase are limited to 2% or less.

17. A producing method of a steel pipe with a dual phase structure, the method comprising,
a hot rolling process of making a hot rolled steel plate under a condition in which an average grain size of a ferrite is controlled to be 1 μm to less than 10 μm by using a steel material which includes, as a chemical composition, by mass %,
C: 0.07% to 0.15%,
Si: 0.1% to 0.5%,
Mn: 0.8% to 1.9%,
Nb: 0.020% to 0.10%,
P: limited to 0.05% or less,
S: limited to 0.01% or less,
Al: limited to 0.1% or less, and
a balance consisting of iron and unavoidable impurities,
wherein a carbon equivalent Ceq defined by an (Equation 3) is 0.25 to 0.40 and [Nb]×[C]≥0.002 is satisfied when a [X] is an amount of an element X in mass %,
a pipe-making process of making a steel pipe of the hot rolled steel plate,
a heating and quenching process of heating the steel pipe to a temperature of more than $Ac_1$ at which an austenite transformation starts to less than $Ac_3$ at which the austenite transformation finishes and of quenching, $$Ceq=[C]+[Mn]/6 \qquad \text{(Equation 3)}$$

where the [X] expresses the amount of the element X in mass %, and
the steel pipe with the dual phase structure comprising, as a metallographic structure, a ferrite and a a secondary hard phase,
wherein, by area %, the ferrite is 80% to 98% and the secondary hard phase is 2 to 20%, and
wherein the secondary hard phase consists of a martensite, a residual austenite, or a mixture thereof.

18. The producing method of the steel pipe with the dual phase structure according to claim 17, wherein the steel material further includes, as the chemical composition, by mass %, at least one of
V: 0.0001% to 0.02%,
Ti: 0.005% to 0.03%,
Ca: 0.001% to 0.010%, and
N: 0.001% to 0.01%,
wherein [V]/[Nb]≤1/3 is satisfied when the [X] is the amount of the element X [in mass %] and the carbon equivalent Ceq is defined as an (Equation 4) on behalf of the (Equation 3), $$Ceq=[C]+[Mn]/6+[V]/5 \qquad \text{(Equation 4)}$$

where the [X] expresses the amount of the element X in mass %.

19. The producing method of the steel pipe with the dual phase structure according to claim 18,
wherein the chemical composition, by mass %, consists of
C: 0.07% to 0.15%;
Si: 0.1% to 0.5%;
Mn: 0.8% to 1.9%;
Nb: 0.020% to 0.10%;
P: limited to 0.05% or less;
S: limited to 0.01% or less;
Al: limited to 0.1% or less;
at least one selected from the group consisting of
V: 0.0001% to 0.02%,
Ti: 0.005% to 0.03%,
Ca: 0.001% to 0.010%, and
N: 0.001% to 0.01%; and
the balance consisting of iron and unavoidable impurities.

20. The producing method of the steel pipe with the dual phase structure according to claim 17,
wherein the chemical composition, by mass %, consists of
C: 0.07% to 0.15%,
Si: 0.1% to 0.5%,
Mn: 0.8% to 1.9%,
Nb: 0.020% to 0.10%,
P: limited to 0.05% or less,
S: limited to 0.01% or less,
Al: limited to 0.1% or less, and
the balance consisting of iron and unavoidable impurities.

* * * * *